United States Patent
Bernal

(10) Patent No.: US 9,577,707 B1
(45) Date of Patent: Feb. 21, 2017

(54) METHOD AND DEVICE FOR STABILIZING IMPEDANCE ON A POWER-LINE COMMUNICATION DEVICE

(71) Applicant: Marvell International Ltd., Hamilton (BM)

(72) Inventor: Antonio Jimenez de Parga Bernal, Valencia (ES)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/795,649

(22) Filed: Jul. 9, 2015

Related U.S. Application Data

(60) Provisional application No. 62/024,259, filed on Jul. 14, 2014.

(51) Int. Cl.
*H04B 3/54* (2006.01)
*H04B 3/30* (2006.01)
*H04L 25/02* (2006.01)

(52) U.S. Cl.
CPC .......... *H04B 3/30* (2013.01); *H04B 3/54* (2013.01); *H04L 25/0272* (2013.01); *H04B 2203/5483* (2013.01)

(58) Field of Classification Search
CPC .... H02J 4/00; H03H 7/06; H03H 7/38; H03H 7/48; H04B 1/04; H04B 3/00; H04B 3/54; H04B 3/544; H04B 3/56; H04B 17/00; H04L 5/006; H04L 25/0272; H04L 25/06; H04M 11/04
USPC ......... 333/32, 124, 181; 340/310.01, 310.03, 340/310.12, 310.16, 310.18; 370/295; 375/222, 257, 258, 317
See application file for complete search history.

(56) References Cited

U.S. PATENT DOCUMENTS

| | | | | |
|---|---|---|---|---|
| 5,805,053 A | * | 9/1998 | Patel | H04B 3/56 340/12.33 |
| 6,115,429 A | * | 9/2000 | Huang | H04B 3/542 340/12.33 |
| 6,396,392 B1 | * | 5/2002 | Abraham | H04B 3/542 340/12.33 |
| 6,741,162 B1 | * | 5/2004 | Sacca | H04B 3/56 307/3 |
| 8,698,573 B2 | * | 4/2014 | Urabe | H04B 3/56 333/124 |
| 9,059,776 B1 | | 6/2015 | Jimenez de Parga et al. | |

(Continued)

OTHER PUBLICATIONS

IEEE P1905.1™/D09, P1905.1™/D09 Draft Standard for a Convergent Digital Home Network for Heterogeneous Technologies, *The Institute of Electrical and Electronics Engineers, Inc.*, 99 pages (Dec. 13, 2012).

(Continued)

*Primary Examiner* — Shawkat M Ali

(57) ABSTRACT

An impedance stabilization network is disposed between a power supply and a mains entry of a power-line communication ("PLC") device. The network may include: a first branch electrically coupled to a phase terminal of the power supply and electrically coupled to the phase line of the mains; a second branch electrically coupled to a neutral terminal of the power supply and electrically coupled to the neutral line of the mains; and a third branch electrically coupled to one or both of the phase terminal and the neutral terminal of the power supply and to the earth line of the mains.

9 Claims, 3 Drawing Sheets

(56) References Cited

U.S. PATENT DOCUMENTS

| | | | |
|---|---|---|---|
| 9,143,198 B2* | 9/2015 | Reuven | H04B 3/56 |
| 2002/0080010 A1* | 6/2002 | Zhang | H04B 3/542 |
| | | | 375/257 |
| 2006/0044076 A1* | 3/2006 | Law | H04B 3/56 |
| | | | 333/124 |
| 2008/0273613 A1* | 11/2008 | Kol | H04B 3/54 |
| | | | 375/260 |
| 2010/0019862 A1* | 1/2010 | Feng | H02M 1/126 |
| | | | 333/181 |
| 2010/0176968 A1* | 7/2010 | White, II | G02B 6/483 |
| | | | 340/870.02 |
| 2012/0086517 A1* | 4/2012 | Urabe | H04B 3/56 |
| | | | 333/17.3 |
| 2012/0183085 A1* | 7/2012 | Hurwitz | H04B 3/54 |
| | | | 375/258 |
| 2012/0201312 A1* | 8/2012 | Schwager | H04B 3/56 |
| | | | 375/257 |
| 2012/0294342 A1* | 11/2012 | Schneider | H04B 3/54 |
| | | | 375/222 |
| 2012/0313764 A1* | 12/2012 | Weiss | H04B 3/56 |
| | | | 340/12.32 |
| 2013/0335207 A1* | 12/2013 | Magin | H04B 3/54 |
| | | | 340/12.37 |
| 2014/0103706 A1* | 4/2014 | Agusti Costa | H04B 3/548 |
| | | | 307/2 |
| 2014/0269952 A1* | 9/2014 | Katar | H04B 3/56 |
| | | | 375/258 |
| 2015/0172036 A1* | 6/2015 | Katar | H04B 3/544 |
| | | | 375/257 |
| 2015/0256222 A1* | 9/2015 | Schwager | H04B 3/54 |
| | | | 375/257 |

OTHER PUBLICATIONS

IEEE P1905.1™—2013, IEEE Draft Standard for a Convergent Digital Home Network for Heterogeneous Technologies, *The Institute of Electrical and Electronics Engineers, Inc.*, 90 pages (Mar. 6, 2013).

* cited by examiner

METHOD AND DEVICE FOR STABILIZING IMPEDANCE ON A POWER-LINE COMMUNICATION DEVICE

CROSS-REFERENCES TO RELATED APPLICATIONS

The present disclosure claims the benefit of U.S. Provisional Patent Application No. 62/024,259, filed Jul. 14, 2014, entitled "Impedance Stabilization Network for MIMO PLC Modems," the disclosure of which is hereby expressly incorporated herein by reference in its entirety.

FIELD OF THE DISCLOSURE

The present disclosure relates generally to power-line communication, and more particularly to a method and devices for stabilizing impedance on a power-line communication device.

BACKGROUND

Power-line communication ("PLC") is a technology that allows power and data to be carried simultaneously on the same conductive path or paths. One convenient application of this technology for consumers is in the area of PLC adapters. A PLC adapter is a device that can be plugged in to a standard electrical outlet and transmit or receive data (via an internal modem of the adapter) over the phase line (also referred to as the "line" or "hot") and use the current from the outlet to power the adapter.

A PLC device typically includes a power supply, such as an alternating-current, direct-current ("AC/DC") power supply. An inevitable side effect of the power supply is that it generates signal disturbances in the differential and common mode. While such disturbances can usually be kept below regulatory limits through the use of standard electromagnetic interference ("EMI") reduction hardware, they are often still high enough to be in the sensitivity range of the modem of the PLC device, thereby affecting the modem's dynamic range.

SUMMARY

According to various embodiments, an impedance stabilization network is between a power supply of a power-line communication ("PLC") device and two or more transceivers of the PLC device. The impedance stabilization network includes: a first branch coupled between a phase terminal of the power supply and a phase node, the phase node for connection to a phase line of a power line; a second branch electrically coupled between a neutral terminal of the power supply and a neutral node, the neutral node for connection to a neutral line of the power line; and a third branch electrically between i) at least one of a) the phase terminal of the power supply and b) the neutral terminal of the power supply, ii) an earth node for connection to an earth line of the power line. The first branch includes a first circuit element, the second branch includes a second circuit element, and the third branch includes a third circuit element. In various embodiments, the first circuit element, the second circuit element, and third circuit element have the same impedance ratings.

According to various embodiments, an impedance stabilization network is disposed between a power supply and a mains entry of a PLC device. The network may include: a first branch electrically coupled to a phase terminal of the power supply and electrically coupled to the phase line of the mains; a second branch electrically coupled to a neutral terminal of the power supply and electrically coupled to the neutral line of the mains; and a third branch electrically coupled to one or both of the phase terminal and the neutral terminal of the power supply and to the earth line of the mains.

According to various embodiments, a PLC device includes a power supply, a first circuit element, a second circuit element, a third circuit element, a first transceiver, a second transceiver, a first transformer, and a second transformer. The power supply has a phase input terminal and a neutral input terminal. In various embodiments, the first circuit element is electrically coupled to the phase terminal, the second circuit element is electrically coupled to the neutral terminal, and the third circuit element is electrically coupled to one or both the neutral terminal and the phase terminal. Each of the transformers has a primary side and a secondary side. In an embodiment, the primary side of the first transformer is electrically coupled to the first circuit element and the second circuit element. In an embodiment, the primary side of the second transformer is electrically coupled to the primary side of the first transformer and to the third circuit element. In an embodiment, both the primary side of the second transformer and the third circuit element are electrically coupled to earth. In various embodiments, the first circuit element, the second circuit element, and the third circuit element have a same impedance rating.

According to various embodiments, a method for operating a PLC device involves determining whether an earth line of a power line to which the power supply of the PLC device is connected is usable for data transmission. When it is determined that the earth line is usable for data transmission, then the method involves operating the PLC device in multiple-input, multiple-output ("MIMO") mode by utilizing a first transceiver electrically coupled to i) a phase line of the power line and ii) a neutral line of the power line, and utilizing a second transceiver electrically coupled to i) one of a) the neutral line or b) the phase line, and ii) the earth line. When it is determined that the earth line is not usable for data transmission, operating the PLC device in a single-input, single-output ("SISO") mode by utilizing the first transceiver and not utilizing the second transceiver.

DETAILED DESCRIPTION

Figure 1:
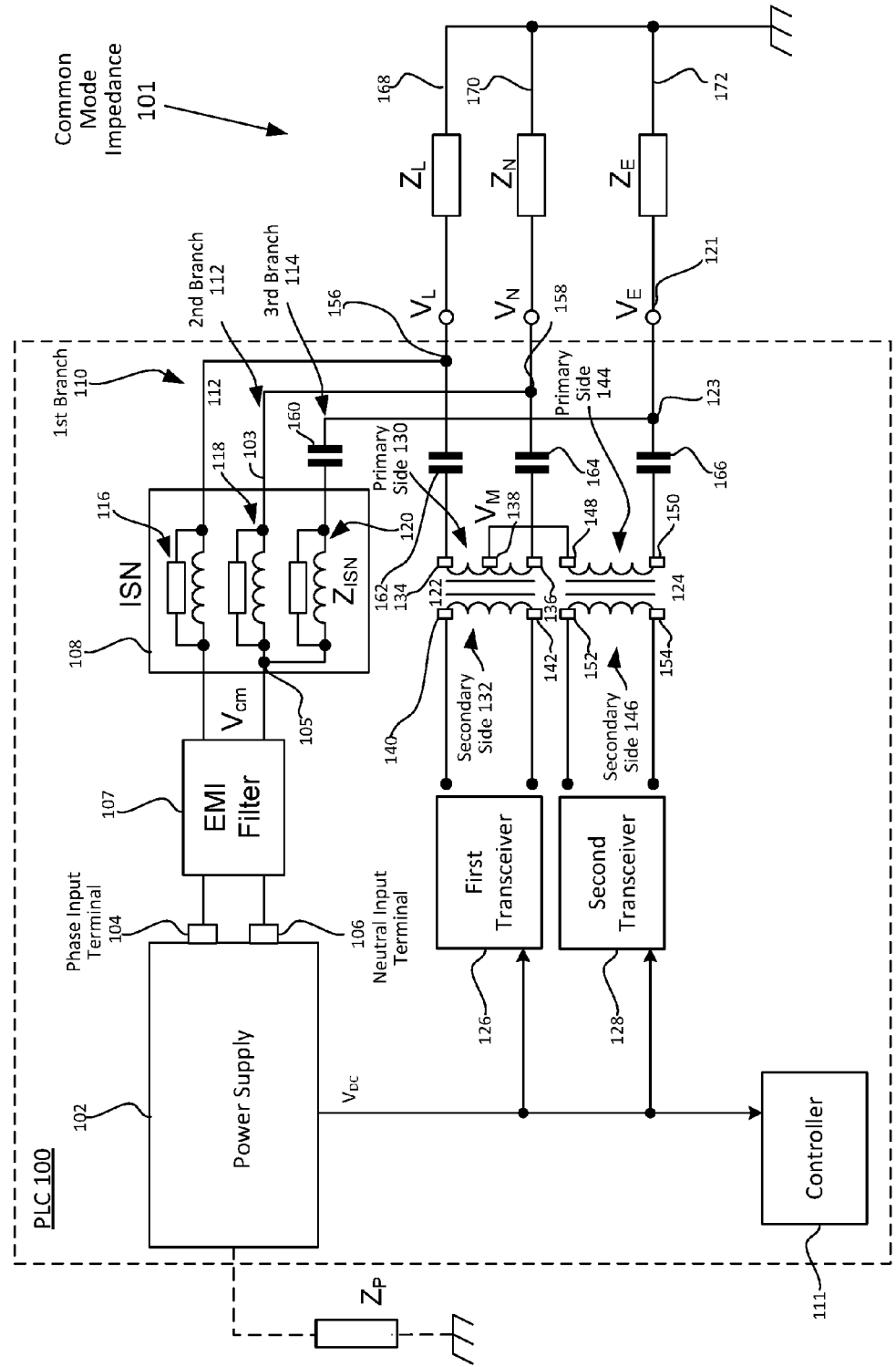
FIG. 1 is a simplified circuit diagram of an example PLC device, according to an embodiment.

FIG. 1 is a simplified block diagram of a PLC device, according to an embodiment. Each line drawn between components in FIG. 1 represents a conductive path (e.g., a conductor, a wire, etc.). The PLC device, generally labeled 100, includes a power supply 102 (e.g., an AC/DC power supply) having a phase input terminal 104, which is electrically coupled to a phase line ($V_L$) of a power line (e.g., mains power), and a neutral terminal 106, which is electrically coupled to a neutral line ($V_N$) of the power line. The power supply 102 receives AC power from the phase line and the neutral line, and generates one or more DC power supply voltages $V_{DC}$ (e.g., a digital power supply voltage and an analog power supply voltage, according to an illustrative embodiment).

The equivalent common mode impedance of a mains network (e.g., household power infrastructure) is represented by circuit elements 101. In particular, the common mode impedance of the phase line of the mains network is represented by $Z_L$, the common mode impedance of the neutral line of the mains network is represented by $Z_N$, and the common-mode impedance of the earth line of the mains network is represented by $Z_E$. The electrical potential of the phase line 168 is $V_L$, the electrical potential of the neutral line 170 is $V_L$, and the electrical potential of the earth line 172 is $V_E$. It should be noted that, at high frequencies, $V_E$ may not be the same as a ground potential due to the effect of $Z_E$.

The PLC device 100 also includes an electromagnetic interference (EMI) filter 107 electrically coupled to the phase input terminal 104 and electrically coupled to the neutral input terminal 106. The EMI filter 107 is configured to mitigate (e.g., reduce, suppress, etc.) EMI generated by the power supply 102 (e.g., common-mode current) so that such EMI entering the power line (e.g., via the phase line and the neutral line) is reduced or suppressed.

The PLC device 100 further includes an impedance stabilization network ("ISN") 108. The ISN 108 includes a first branch 110, a second branch 112, and a third branch 114. The first branch 110 includes a first circuit element 116 (e.g., one or more inductors in combination with one or more resistors) that is electrically coupled to the phase terminal 104 via the EMI filter 107. The second branch 112 includes a second circuit element 118 that is electrically coupled to the neutral terminal 106 via the EMI filter 107. The third branch 114 includes third circuit element 120 that is electrically coupled to the second branch 112 at a junction 105 and to an earth line 121 (e.g., a ground line of a power line terminal or other suitable conductive pathway to an earth (or ground) potential at a junction 123. The earth line 121, in an embodiment, is an electrical ground. According to an embodiment, the first circuit element 116, the second circuit element 118, and the third circuit element 120 have the same impedance rating (e.g., within a suitable tolerance).

Continuing with FIG. 1, the PLC device 100 further includes a first transformer 122, a second transformer 124, a first transceiver 126, and a second transceiver 128. In an embodiment, each of the first transformer 122 and the second transformer 124 is a respective differential coupling transformer. The first transformer 122 has a primary side 130 and a secondary side 132. The primary side 130 includes a first terminal 134, a second terminal 136, and a tap 138 located between the first terminal 134 and the second terminal 136. The secondary side 132 includes a first terminal 140 and a second terminal 142. The second transformer 124 has a primary side 144 and a secondary side 146. The primary side 144 includes a first terminal 148 and second terminal 150. The secondary side 146 includes a first terminal 152 and a second terminal 154. The first terminal 148 of the second transformer 124 is electrically coupled to the tap 138. Alternative configurations may also be used. For example, the first terminal 148 of the second transformer 124 could be electrically coupled to the second terminal 136 of the first transformer 122.

At high frequencies, the first terminal 134 of the first transformer 122 is electrically coupled to the first branch 110 of the ISN 108 at a junction 156, the second terminal 136 of the first transformer 122 is electrically coupled to the second branch 112 of the ISN 108 at a junction 158, and the second terminal 150 of the second transformer 124 is electrically coupled to the earth line 172. At low frequencies, first and second terminals 134 and 136 are isolated from the first, second, and third branches 110, 112, and 114 by capacitive elements, which are discussed below in more detail.

The first terminal 140 and the second terminal 142 of the first transformer 122 are electrically coupled to the first transceiver 126. Similarly, the first terminal 152 and the second terminal 154 of the second transformer 124 are electrically coupled to the second transceiver 128. According to an embodiment, the first transceiver 126 communicates on a first MIMO channel ("CH1") and the second transceiver 128 communicates on a second channel ("CH2"). In particular, the CH1 corresponds to communications via the phase line and the neutral line, whereas CH2 corresponds to communications via the phase and neutral lines, and the earth line.

In an embodiment, a capacitive element 160 (e.g., one or more capacitors) is electrically coupled to the ISN 108 along the third branch 114 between the ISN 108 (e.g., the third circuit element 120) and the junction 123; a capacitive element 162 is electrically coupled to the first terminal 134 between the first terminal 134 and the junction 156 (i.e., the phase input terminal 104); a capacitive element 164 is electrically coupled to the second terminal 136 between the second terminal 136 and the junction 158 (i.e., the neutral terminal 106); and a capacitive element 166 is electrically coupled to the second terminal 150 between the second terminal 150 and the junction 123 (i.e., an earth terminal 172). Additionally, between the power supply 102 and earth is a parasitic impedance $Z_P$. The impedance $Z_P$ may include a combination of a capacitance between a printed circuit board and earth, and the inductance of ancillary wires (e.g. an Ethernet cable).

An impedance of a phase line 168 (e.g., the impedance of the phase line in the vicinity of the PLC device 100 or the common-mode impedance of the phase line to earth) is represented by $Z_L$. An impedance of a neutral line 170 (e.g., the impedance of the neutral line in the vicinity of the PLC device 100 or the common-mode impedance of the neutral line to earth) is represented by $Z_N$. An impedance of an earth terminal 172 (e.g., the impedance of the electrical wiring in the vicinity of the PLC device 100 that provides a conductive pathway to the earth potential) is represented by $Z_E$.

According to an embodiment, the power supply 102 generates a noise signal that is generally inserted into the power line. Although much of the noise generated by the power supply 102 is reduced by the EMI filter 107, some of the noise signal is inserted into the power line and can therefore adversely affect performance of the PLC device 100. Because the impedance rating of the first circuit element 116 and the impedance rating of the second circuit element 118 (in an embodiment) are the same (e.g., within a suitable tolerance), the magnitude and frequency components of the noise (originating from the power supply 102) on the phase line is very similar the magnitude and frequency components of the noise (originating from the power supply 102) on the neutral line. Without the third circuit element 120 in place, however, the noise is not seen on the earth line 121 (or is greatly reduced) because, without the third circuit element 120 in place, the input terminals 104, 106 of the power supply 102 are not electrically coupled to the earth line. Thus, without the third circuit element 120 in place, the noise on the earth line is significantly different than the noise on the phase line and the neutral line. The transformers 122 and 124 are very good at rejecting common mode noise, but not at rejecting differential mode noise.

In fact, they are typically intended to be efficient in coupling differential signals. Thus, without the third circuit element 120 in place, more noise (originating from the power supply 102) is seen on CH2 (corresponding to the neutral line and the earth line).

In an embodiment, junctions 123, 156, 158 correspond to, or are coupled to, a mains entry, and the ISN 108 is disposed between the power supply 102 and the mains entry.

In an embodiment, the noise originating from the power supply 102 is introduced onto the earth line via the third circuit element 120. As a result, the noise signal on the earth line is very similar (e.g., within 1 or 2 decibels) of the noise signal on the phase line and the neutral line. Thus, the PLC device 100 is able to take advantage of the common mode rejection of the second transformer 124 to reduce the noise level seen by the second transceiver 128. As a result, the signal that reaches the second transceiver 128 is relatively clean (as compared to a device without the third circuit element 120 in place), due to the common mode filtering properties of the second transformer 124.

Referring still to FIG. 1, in an embodiment, a voltage $V_E$ at the earth terminal may be represented as a function of an impedance $Z_{ISN}$ of the impedance network 108, a voltage $V_{CM}$ of the common-mode noise from the power supply 102, and a common-mode impedance $Z_E$ of one or more electrical wires to an earth potential as follows:

$$V_E = \frac{V_{CM} \cdot Z_E}{Z_{ISN} + Z_E} \qquad \text{Equation 1}$$

In an embodiment, a voltage $V_M$ at the first terminal 148 of the second transformer 124 is a function of the impedance $Z_{ISN}$ of the impedance network 108, the voltage $V_{CM}$ of the common-mode noise from the power supply 102, the impedance $Z_L$ of the phase line 168, and the impedance $Z_N$ of the neutral line 170:

$$V_M = \frac{V_{CM} \cdot Z_L \parallel Z_N}{\frac{Z_{ISN}}{2} + Z_L \parallel Z_N} \qquad \text{Equation 2}$$

In an embodiment, assuming a transformer turn ratio of 1:1, a voltage $V_{EM}$ at the second transceiver 128 can be represented as a function of the impedance $Z_{ISN}$ of the impedance network 108, the voltage $V_{CM}$ of the common-mode noise from the power supply 102, the impedance $Z_L$, and the impedance $Z_N$ as follows:

$$V_{EM} = V_{CM} \cdot \left[ \frac{Z_E}{Z_{ISN} + Z_E} - \frac{Z_L \parallel Z_N}{\frac{Z_{ISN}}{2} + Z_L \parallel Z_N} \right] \qquad \text{Equation 3}$$

In practice, in various embodiments, $Z_L \approx Z_N \approx Z_E$, so the two terms within the brackets in Equation 3 cancel each other and the conversion of $V_{CM}$ to differential would be 0. If the third branch 114 were not employed, then the first term of Equation 3 would be 0 and the resulting $V_{EM}$ would be non-zero.

In an embodiment, each of the elements 116, 118, and 120 are designed to act as a low-pass filter presenting a low impedance at 50 Hz and/or 60 Hz, and a high impedance at frequencies used for PLC communications.

In some embodiments, rather than the element 120 being electrically coupled to the element 118 at junction 105, the element 120 is electrically coupled to the element 116 at a similar junction (not shown). In another embodiment, the element 120 is electrically coupled to the center of a capacitive divider between the ISN 108 and the EMI filter 107 to filter differential noise.

According to an embodiment, the PLC device 100 includes a controller 111 that switches the PLC device 100 between (1) a first mode in which either the first transceiver 126 or the second transceiver 128 are used for communication (e.g., MIMO mode), and (2) a second mode in which only one of the first transceiver 126 and the second transceiver 128 is used for communication (e.g., SISO mode). In some embodiments, the controller 111 includes a processor configured to execute software and/or firmware instructions, and the controller 111 includes, or is coupled to, a memory storing the software and/or firmware instructions. In some embodiments, the controller 111 comprises a hardware-implemented controller (e.g., a hardware implemented state machine).

Figure 2:
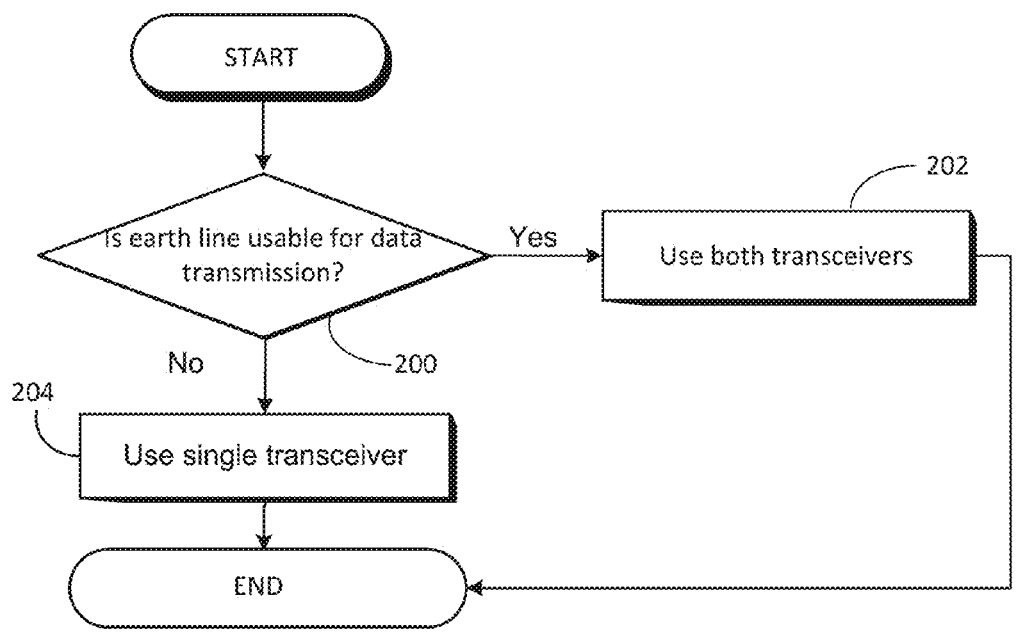
FIG. 2 is a flow diagram of an example method for operating a PLC device, according to an embodiment.

FIG. 2 is a flow diagram of an example method for operating a PLC device, such as the PLC device 100 or another suitable PLC device. Thus, the method of FIG. 2 is discussed with reference to FIG. 1 for illustrative purposes. In other embodiments, however, the method of FIG. 2 is implemented by another suitable PLC device.

At block 200, the controller 111 determines whether an earth line is usable for data transmission (e.g., determines whether the PLC device 100 is electrically connected to an earth line (e.g., to a ground conductor or prong), and, if so, determines whether it be appropriate to use the earth line). If the controller 111 determines that the PLC device 100 is electrically connected to an earth line, then the controller 111 controls the PLC device 100 to use both transceivers 126, 128 (e.g., operate PLC device 100 in MIMO mode) as described above (block 202). If, on the other hand, the controller 111 determines that the PLC device 100 is not electrically connected to an earth line, then the controller controls the PLC device 100 so that the second transceiver 128 is not utilized (block 204). In an embodiment, block 204 includes not supplying power (e.g., $V_{DC}$) to the second transceiver or putting the second transceiver in a sleep mode. In other words, the controller 111 ensures that only the first transceiver 126 is used for communication (e.g., operate PLC device 100 in SISO mode).

Figure 3:
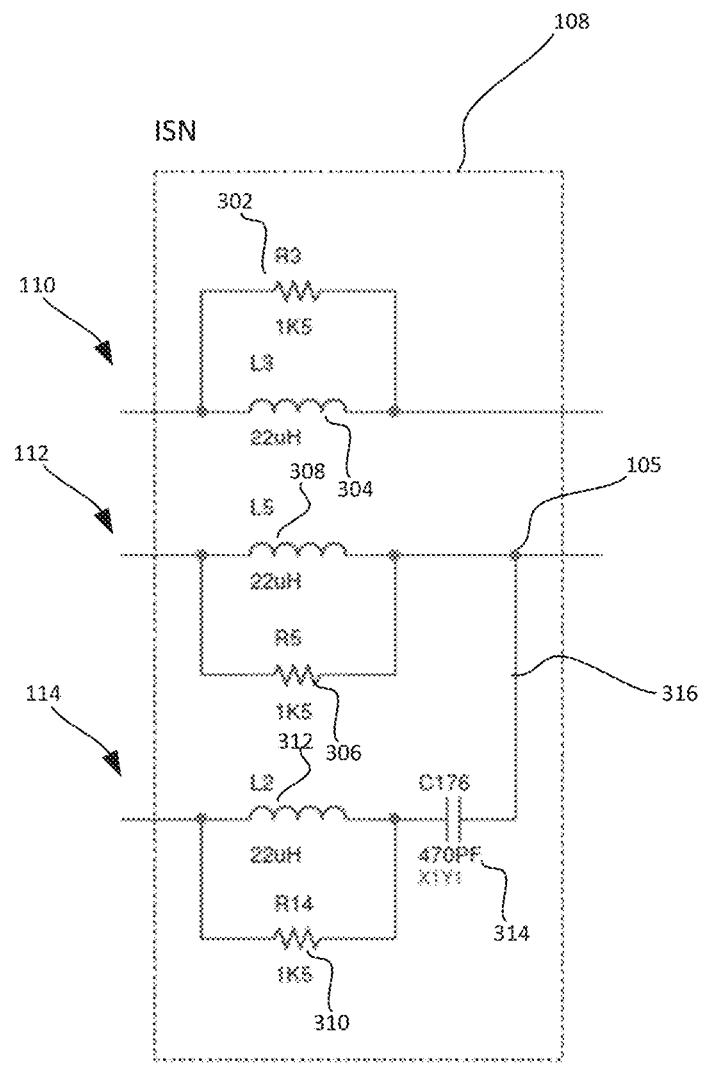
FIG. 3 is a simplified circuit diagram of an example impedance stabilization network, according to an embodiment.

FIG. 3 is a simplified circuit diagram of an example implementation of the ISN 108 from FIG. 1, according to an embodiment. In this embodiment, the first branch 110 includes a resistor 302 coupled in parallel with an inductor 304; the second branch 112 includes a resistor 306 coupled in parallel with an inductor 308; and the third branch 114 includes a resistor 310 coupled in parallel with an inductor 312. In an embodiment, all of the resistors 302, 306, and 310 have the same resistance rating (1,500 Ohms in the example of FIG. 3, or another suitable resistance rating), and each of the inductors 304, 308, and 312 have the same inductance rating (22 micro-Henrys in the example of FIG. 3, or another suitable inductance rating). In an embodiment, each of the resistors 302, 306, and 310 not only have the same resistance rating, but are also of the same model and manufacturer. Similarly, in an embodiment, each of the inductors 304, 308, and 312 not only have the same inductance rating, but are also of the same model and manufacturer. According to an embodiment, the selection of the components for the first branch 110 and the second branch 112 is carried out so as to minimize PLC signal leak and differential noise. The ISN 108 of FIG. 2 also includes a capacitor 314 on a conductive path 316 that electrically couples the second branch 112 and the third branch 114. The capacitor 314 (which is 470 pico-Farads in the illustrated example, or another suitable capacitance value) blocks signals at 50 Hz and/or 60 Hz, but may have a negligible effect on the noise signal.

In another embodiment, rather than the branch 114 being electrically coupled to the branch 112 at junction 105, the branch 114 is electrically coupled to the branch 110 at a similar junction (not shown).

At least some of the various blocks, operations, and techniques described above may be implemented utilizing hardware, a processor executing firmware instructions, a processor executing software instructions, or any combination thereof. When implemented with one or more processors executing firmware and/or software instructions, the instructions are stored in one or more memory devices coupled to the one or more processors.

When implemented in hardware, the hardware may comprise one or more of discrete components, an integrated circuit, an application-specific integrated circuit, a programmable logic device, etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A power-line communication ("PLC") device comprising:
   a power supply comprising a phase input terminal and a neutral input terminal;
   a first circuit element electrically coupled to the phase input terminal;
   a second circuit element electrically coupled to the neutral input terminal;
   a third circuit element i) electrically coupled to one of the neutral input terminal and the phase input terminal, or ii) electrically coupled to both of the neutral input terminal and the phase input terminal via one or more fourth circuit elements;
   a first transceiver;
   a second transceiver;
   a first transformer comprising
      a primary side electrically coupled to the first circuit element and the second circuit element, and
      a secondary side electrically coupled to the first transceiver; and
   a second transformer comprising
      a primary side electrically coupled to the primary side of the first transformer and to the third circuit element,
      a secondary side electrically coupled to the second transceiver;
   wherein the first circuit element, the second circuit element, and the third circuit element have a same impedance rating.

2. The PLC device of claim 1, wherein
   the primary side of the first transformer comprises a first terminal electrically coupled to the first circuit element and a second terminal electrically coupled to the second circuit element.

3. The PLC device of claim 1, wherein
   the primary side of the first transformer comprises a first terminal, a second terminal, and a tap disposed between the first terminal and the second terminal, and
   the primary side of the second transformer comprises a first terminal that is electrically coupled to the tap.

4. The PLC device of claim 1, wherein the first circuit element acts a first low pass filter configured to provide high impedance at frequencies used for PLC communications, the second circuit element acts a second low pass filter configured to provide high impedance at frequencies used for PLC communications, and the third circuit element acts a third low pass filter configured to provide high impedance at frequencies used for PLC communications.

5. The PLC device of claim 1, wherein the first circuit element, the second circuit element, and the third circuit element are electrically coupled to the power supply via an electromagnetic interference filter.

6. The PLC device of claim 1, wherein the first circuit element, the second circuit element, and the third circuit element are components of a passive impedance stabilization network.

7. The PLC device of claim 6, wherein the first circuit element consists of a resistor in parallel with an inductor, the second circuit element consists of a resistor in parallel with an inductor, and the third circuit element consists of a resistor in parallel with an inductor.

8. The PLC device of claim 1, wherein
   the third circuit element is electrically coupled to the second circuit element via a capacitor that suppresses at least one of i) 50 Hz signals and ii) 60 Hz signals.

9. The PLC device of claim 1, wherein
   the third circuit element is electrically coupled to the first circuit element via a capacitor that suppresses at least one of i) 50 Hz signals and ii) 60 Hz signals.

* * * * *